United States Patent
Lyons et al.

(10) Patent No.: US 9,965,988 B2
(45) Date of Patent: May 8, 2018

(54) SYSTEM, APPARATUS AND METHOD FOR DYNAMICALLY ADJUSTING A VIDEO PRESENTATION BASED UPON AGE

(71) Applicant: BALLY GAMING, INC., Las Vegas, NV (US)

(72) Inventors: Martin S. Lyons, Henderson, NV (US); Scott T. Hilbert, Sparks, NV (US); Sean C. Martin, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 216 days.

(21) Appl. No.: 14/889,796

(22) PCT Filed: Apr. 25, 2014

(86) PCT No.: PCT/US2014/035537
§ 371 (c)(1),
(2) Date: Nov. 6, 2015

(87) PCT Pub. No.: WO2014/182475
PCT Pub. Date: Nov. 13, 2014

(65) Prior Publication Data
US 2016/0109942 A1    Apr. 21, 2016

Related U.S. Application Data

(60) Provisional application No. 61/820,342, filed on May 7, 2013.

(51) Int. Cl.
*G09G 3/20* (2006.01)
*G06T 7/90* (2017.01)
(Continued)

(52) U.S. Cl.
CPC ............. *G09G 3/2003* (2013.01); *G06F 3/01* (2013.01); *G06F 3/012* (2013.01); *G06K 9/00* (2013.01);
(Continued)

(58) Field of Classification Search
None
See application file for complete search history.

(56) References Cited

U.S. PATENT DOCUMENTS 7,351,151 B1    4/2008    Crowder, Jr.
7,419,427 B2    9/2008    Boushy
(Continued)

OTHER PUBLICATIONS

Berman, "The Reengineering of Lighting Photometry," Lawrence Berkeley National Laboratory, Berkeley, California, USA, Jul. 1995, 11 pages.
(Continued)

*Primary Examiner* — Patrick F Marinelli
(74) *Attorney, Agent, or Firm* — Philip J. Anderson

(57) ABSTRACT

A system, method and apparatus are set forth which adjusts one or more of the brightness, vibrancy and color shift of displayed content based upon the at least approximate age of the viewer. At a display (15) the user's age is at least approximated by accessing an established user data file (835, 837) containing age determining data and/or capturing a facial image (804) of the user and processing the same to determine at least the approximate age of the user. Based upon the age determination the brightness, vibrancy and/or color shift may be adjusted to account for the effects of the aging of the human eye. User overrides (900, 902, 904) may be provided for the user to alter or turn off the adjustments. Adjustment of the brightness, vibrancy and/or color shift may also take into account ambient light conditions.

19 Claims, 11 Drawing Sheets

(51) Int. Cl.
*G06K 9/46* (2006.01)
*G06F 3/01* (2006.01)
*G09G 5/02* (2006.01)
*G09G 5/10* (2006.01)
*G06K 9/00* (2006.01)

(52) U.S. Cl.
CPC ....... *G06K 9/00288* (2013.01); *G06K 9/4652* (2013.01); *G06K 9/4661* (2013.01); *G06T 7/90* (2017.01); *G09G 5/02* (2013.01); *G09G 5/10* (2013.01); *G06K 2009/00322* (2013.01); *G09G 2320/0626* (2013.01); *G09G 2320/0666* (2013.01); *G09G 2340/14* (2013.01); *G09G 2354/00* (2013.01); *G09G 2360/144* (2013.01)

(56) References Cited

U.S. PATENT DOCUMENTS

| | | | |
|---|---|---|---|
| 8,721,427 B2 | 5/2014 | Kelly et al. | |
| 2004/0008208 A1 | 1/2004 | Dresevic et al. | |
| 2007/0058528 A1* | 3/2007 | Massa | G06F 11/005 370/218 |
| 2008/0139305 A1 | 6/2008 | Vallejo et al. | |
| 2009/0149253 A1 | 6/2009 | Kelly et al. | |
| 2009/0201309 A1 | 8/2009 | Demos | |
| 2009/0291757 A1* | 11/2009 | Hilbert | G07F 17/3202 463/31 |
| 2011/0111853 A1 | 5/2011 | Mitchell et al. | |
| 2011/0175925 A1 | 7/2011 | Kane et al. | |
| 2012/0182276 A1 | 7/2012 | Kee | |
| 2012/0327139 A1 | 12/2012 | Margulis | |
| 2013/0057573 A1* | 3/2013 | Chakravarthula | G06F 3/005 345/619 |
| 2013/0274007 A1* | 10/2013 | Hilbert | A63F 13/00 463/29 |
| 2013/0314581 A1* | 11/2013 | Kido | H04N 5/23293 348/333.12 |
| 2014/0028545 A1* | 1/2014 | Tsai | G06F 3/005 345/156 |
| 2014/0172309 A1* | 6/2014 | Guthrie | G06F 15/00 702/19 |
| 2016/0109942 A1* | 4/2016 | Lyons | G06F 3/01 345/156 |
| 2016/0293139 A1* | 10/2016 | Kwon | G09G 5/02 |

OTHER PUBLICATIONS

"CIE 1931 color space", Oct. 29, 2015, URL=https://en.wikipedia.org/w/index.php?title=CIE_1931_color_space&oldid=688082295, download date May 5, 2017, 9 pages.

Porkomy et al., "Aging of the human lens," *Applied Optics* 26(8):1437-1440, 1987.

"RGB/XYZ Matrices," Sep. 19, 2015, URL=https://web.archive.org/web/20150919193228/http://www.brucelindbloom.com/index.html?Eqn_RGB_XYZ_Matrix.html, download date May 5, 2017, 4 pages.

Schieber, "Human Factors and Aging: Identifying and Compensating for Age-related Deficits in Sensory and Cognitive Function," in Charness et al. (eds.), *Impact of technology on successful aging*, Springer, New York, New York, USA, 2003, pp. 42-84. (62 pages).

* cited by examiner

SYSTEM, APPARATUS AND METHOD FOR DYNAMICALLY ADJUSTING A VIDEO PRESENTATION BASED UPON AGE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Field of the Disclosure

This disclosure relates to dynamic adjustment of a video presentation such as one or more of field of the disclosure relates to apparatus, systems, methods and application for controlling one or more of the brightness, vibrancy, color temperature and/or color shift based upon at least an estimated age of the viewer.

2. Description of the Related Art

Human beings do not perceive color in a uniform way. Porkony et al., "Aging of the Human Lens", Applied Optics, Vol. 26, No. 8, 15 Apr. 1987 (http://macboy.uchicago.edu/~eye1/PDF%20files/Pokorny.et.al.%20lens.pdf) describe how the human eye lens increases in density as we get older, and because the lens thereby absorbs more strongly in the UV and short-wavelength region, this leads to less discrimination between blue and green colors. Other researchers such as Schieber, "Human Factors and Aging: Identifying and Compensating for Age-related Deficits in Sensory and Cognitive Function", Heimstra Human Factors Laboratories, Department of Psychology, University of South Dakota, 415 E. Clark Street, Vermillion, S. Dak. 57069, Mar. 15, 2002 (FINAL DRAFT) (http://people.usd.edu/~schieber/psyc423/pdf/human-factors.pdf), more recently, have attributed this "red shift" phenomenon to a greater loss of sensitivity of shorter wavelengths at photoreceptors (cones) in the retina.

Berman, "The Re-engineering of Lighting Photometry", Energy and Environment Division, Lawrence Berkeley National Laboratory, Berkeley Calif. 94720, July 1995, LBNL-42327, L-213 (http://gaia.lbl.gov/btech/papers/42327.pdf) describes how perception of brightness, and thus smaller pupil size (leading to better resolution of contrast, depth of field and acuity) can be improved by increasing the color temperature of illumination. By color temperature what is meant is the temperature of an ideal black body that radiates light of a comparable hue.

Technologies currently exist to adjust the perception of color on a video display. One such example is produced by eeColor, St. Augustine Fla. (http://www.eecolor.com/). eeColor's technology works by using pixel "shaders" present in a graphics processing unit (GPU) to remap the colors being displayed. This remapping occurs for every image as it is displayed on the LCD monitor. eeColor's algorithms, presumably based upon look-up-tables or transformation matrices, increase the perceived vibrancy of an image. One way this may be achieved would be to map the red-green-blue (RGB) colors of each pixel into HSV (Hue Saturation Value), and then increase the S (Saturation) component by a nonlinear factor such that high saturation values are not increased much, if at all.

The effect to a user of an eeColor modified display is of an image with better vibrancy, but with no perceived change to brightness.

The eeColor technology suffers from several drawbacks. For video content which is intended for extended viewing such as video games, movies, casino style games (whether played on a pay-to-play (P2P) basis or for purely entertainment purposes), designers, post-processors and editors design the graphics for such extended view. Applying the eeColor solution may have a detrimental effect on the content by adjusting what has been finely tuned by experienced designers and editors. As stated above, this is particularly true for casino-style video games where a player may play for one or several hours. Further the adjustment does not take into account human eye perception performance as related to the viewer's age. However, an approach such as suggested by eeColor may have advantages if selectively deployed such as where there are multiple viewers or for short term viewing such as when a casino game in an "attract mode" showing graphic content to attract a player.

In a heretofore unrelated technology there has been developed technology for passively detecting biometric features of a human such as facial features and from that estimating the viewer's age. For example Fraunhofer Institute for Integrated Circuits, Am Wolfsmantel 33, 91058, Erlangen, Germany, has developed software named SHORE™ from which the age of a subject can be estimated based upon a captured image of the subject's face. This technology is touted as being able to estimate the age with a mean absolute error of 6.85 years.

In certain enterprises a user, customer or patron's age can be directly obtained. As but an example, in a casino enterprise, a player may enroll in a player loyalty program of the type described in Boushy, U.S. Pat. No. 7,419,427 issued Sep. 2, 2008 and titled "National Customer Recognition System and Method", the disclosure of which is incorporated by reference. Bally Gaming, Inc. d/b/a Bally Technologies manufactures, sells, installs and maintains such systems currently as its ACSC-CMS system. Enrollment in the loyalty program actively obtains the player's age though the application and enrollment process or by the player providing an identification document such as a driver's license providing a date of birth from which the player's current age can be determined. Other "active" enrollment processes which obtain age data are credit card applications, and other loyalty programs such as airline frequent flyer programs. These programs and facilities result in a database storing user/player data including data indicative of the user/player's age which can be accessed.

In one aspect there is a need for video displays and graphic and video processing units to be able to, based upon a viewer's or user's age to adjust certain video perceptions as viewed by the user to account for the aforesaid typical "red shift" for older people to better present the content to the user. In this regard there is a need to be able to obtain age data for the viewer, either passively of actively.

There is a need in such an approach to provide one or more default settings which can be applied where age cannot be determined or in other instances such as an advertising or attract mode.

There is a need to provide such solutions not only in the casino and on-line gaming environment but in other environments where graphic and video content is presented particularly over extended periods of time or where there is a desire to adjust the presentation brightness, vibrancy, color temperature and/or color shift based upon the viewer's age.

There is a need to provide video displays and graphic and video processing units to be able to, based upon one or more of a viewer's or user's age or viewer's age associated with the content demographic to adjust certain video perceptions as viewed by the user to account for the aforesaid typical "red shift" for older people to better present the content to the user.

SUMMARY OF THE DISCLOSURE

In one aspect of the present disclosure there is provided according to embodiments of the present disclosure an apparatus, method and system for adjusting one or more video or graphic presentation parameters of brightness, vibrancy, color temperature and/or color shift for video/graphic content based at least in part upon an assessment of the viewer's age. The user's age can be passively determined as from an acquired facial image of the viewer and processing the same to make an age range assessment. Age can also be determined by accessing one or more databases where the user has provided age data such as a loyalty program or credit card database or by requesting the user to enter their age or date of birth or select an age range. Age or age groupings can also be at least estimated or suggested based upon a demographic of a likely viewer of the content. That is, where the content is more likely to be viewed by older viewers, the adjustment may be applied. Also, vibrancy technology can thus be used to facilitate long-term play, and to better discern gaming or other content.

In an embodiment the apparatus, method, system application includes a facility which acquires data corresponding to or from which at least an approximate age of the user can be determined. This data is provided to a processor. Based upon the age data from the facility the processor adjusts one or more of the brightness, color temperature, vibrancy and color shift for the displayed images. For example, if it is determined that the user is over middle age, the processor may adjust brightness, color temperature and vibrancy and shift the color of at least one or more portions of the video graphics to, for example, enhance the vibrancy of the blue and green colors to overcome the tendency of aged human eye lenses to absorb the UV and short-wavelengths which leads to less discrimination between blue and green colors. Additionally or apart from enhancing the vibrancy of the green and blue colors, a color shift may be applied to shift those colors more toward the red end of the color spectrum.

In a specific embodiment for a gaming enterprise such as a casino, gaming devices are equipped with a digital camera to capture a biometric feature of a player such as their face or a portion thereof, e.g. the eyes or the area around the eyes. Capturing of a facial image of a player is described in U.S. patent application Ser. No. 13/311,000 filed Dec. 5, 2011 and titled "A Gaming System, Method and device for Generating Images Having a Parallax Effect Using Face Tracking" assigned to the assignee of the present disclosure and the disclosure of which is hereby incorporated by reference. Using the biometric feature and a processor controlled by software the age of a player setting at the gaming machine can be estimated. In the event the player inserts their loyalty card at the gaming device, the processor can access the player's account to determine the player's age. Both approaches may be used in the event the player is using a relative's or friend's loyalty card. Software, where both the acquisition of a biometric feature and a loyalty card are used to determine an actual age and there is a conflict would be subject to a predetermined resolution such as relying upon the biometric approach. Based upon the estimated or determined age of the player a graphics processing unit would apply one or more of brightness, vibrancy, color temperature and color shift to the graphics and video presented to the player. In an embodiment the player may have the option to "turn off" the enhancement or using an input device to modify the adjustment, within limits, to their liking.

Thus, in one approach the disclosure can be implemented in an Alpha 2 cabinet including a digital webcam or other camera connected by a USB to an Alpha 2 suitcase. There can be further provided a Nvidia Pixel shading 2.0 or better capable GPU. Moreover, in a specific approach, an Open CL or equivalent programming may be employed for programming pixel shapers of a GPU and demographic or facial detection technology such as Fraunhofer SHORE can be utilized.

In an embodiment a downloadable software application may be provided to a video device for controlling the features in a manner described above. The application may access a device-internal or an external database to acquire at least approximate age data or the user may be prompted to enter such data. Based upon the determined at least approximate age the application may control the device video display one or more of brightness, vibrancy, color temperature and color shift to the graphics and video presented to the user. The application may also include data for default configurations of brightness, vibrancy, color temperature and color shift and conditions wherein a default configuration is to be applied.

In a further embodiment a facility may be provided to determine ambient light conditions for the video display and control the device video display one or more of brightness, vibrancy, color temperature and color shift to the graphics and video presented to the user. The control may take into account both the age as well as ambient light conditions according to one or more control protocols. User inputs may also control one or more of brightness, vibrancy, color temperature and color shift. Further, vibrancy enhanced color can be provided for only certain or selected states of operation. Moreover, there is contemplated an interpretation of adjustments for one or more applications of the disclosure to make adjustments less perceptible.

Other features and numerous advantages of the various embodiments will become apparent from the following detailed description when viewed in conjunction with the corresponding drawings.

DETAILED DESCRIPTION OF THE PREFERRED EMBODIMENTS

The following description is primary directed to an implementation of the present disclosure in a gaming environment. However it should be understood that the present disclosure has applications outside of gaming such as in the delivery of video (video, graphic and animations) to display devices such as televisions, personal computer monitors and displays, kiosks, smart phones, cellular phones, laptop computers, tablet computers, display glasses, electronic table displays and electronic table games and the like.

Figure 1:
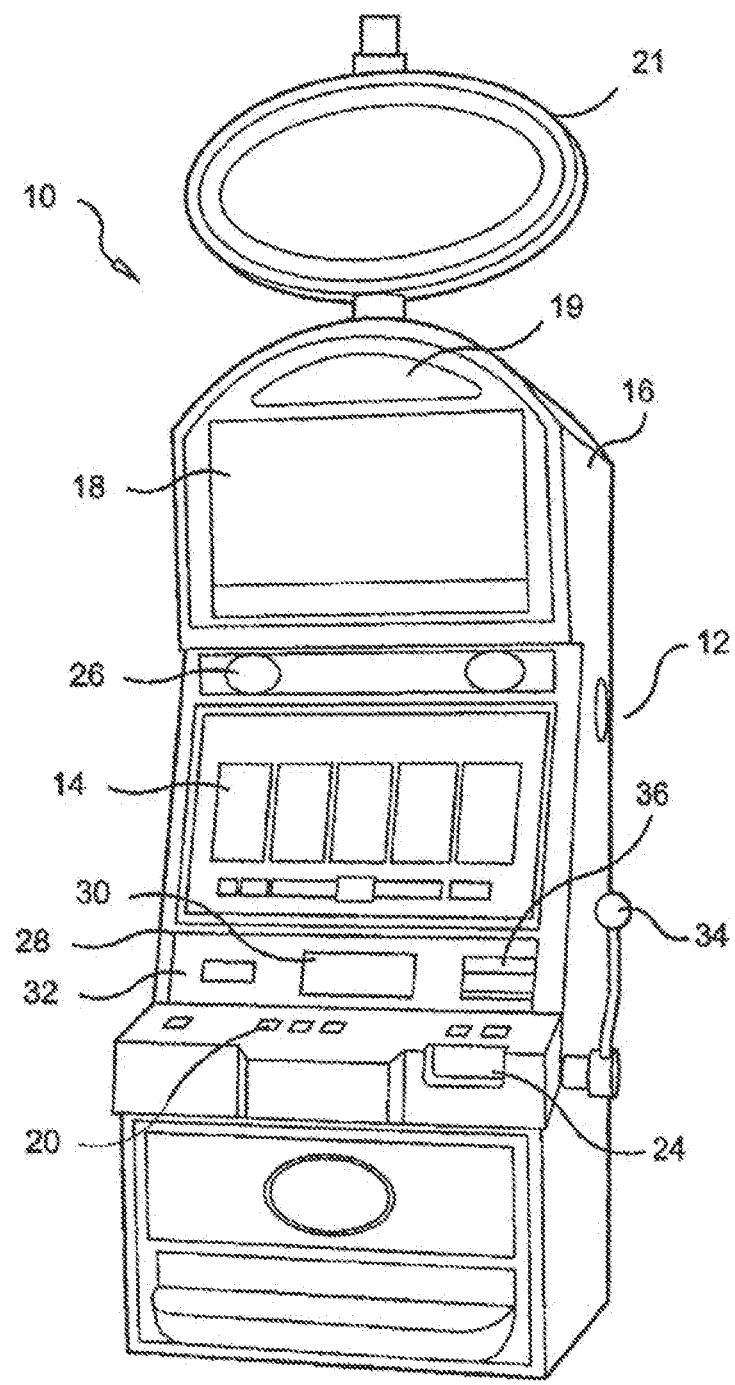
FIG. 1 illustrates a gaming terminal.

Referring now to the drawings, wherein like reference numbers denote like or corresponding elements throughout the drawings, and more particularly referring to FIG. 1, a gaming device 10 according to one or more embodiments of the present disclosure is shown. The gaming device 10 includes cabinet 12 providing an enclosure for the several components of the gaming device 10 and associated equipment. A primary game display 14 is mounted to the cabinet 12. The primary game display 14 may be a video display such as an LCD, plasma, OLED or other electronic display or it may be an electro-mechanical display such as electro-mechanical stepper reels as are known in the art combined with video display units such as overlays or adjacent video displays of the type described above. The primary game display 14 may also be embodied as a combination of two or more electronic or mechanical displays disposed in an adjacent overlapping or overlying arrangement. The primary game display 14 may be mounted to one or more of a door for the cabinet 12 or the cabinet chassis itself. The primary game display 14 is located to display game content (and if desired other content) to the player. For example, the game content may be game outcomes presented by a plurality of video or electro-mechanical reels displaying symbols the combinations of which define winning or losing outcomes, video Poker, Keno or other form of base casino wagering game as is known in the art. Where the primary game display 14 is a video display, features such as bonus/feature games may also be presented. The foregoing description should not be deemed as limiting the content (graphics, video or text) which can be displayed at the primary game display 14. The cabinet 12 may comprise a slant-top, bar-top, or table-top style cabinet as is known in the art.

The gaming device 10 also includes in one or more embodiments a top box 16 which may support a printed back-lit glass (not shown) as is known in the art depicting the rules, award schedule, attract graphics or it may support a secondary game display 18 which may be of one of the types described above with reference to the primary game display 14. The top box 16 may also support a backlit glass with graphics defining a marquee 19 and a topper 21 including additional graphics.

To enable a player to provide input to the controller for the gaming device 10 a plurality of buttons 20 may be provided on a button deck for the gaming device 10. Additionally and alternatively one or both of the primary and secondary game displays 14, 18 may include touch screen input devices as are known in the art. Buttons, selections or inputs are displayed at the primary and secondary game displays 14, 18 and the player touching those icons or designated areas provides the required or desired input to configure and play the gaming device 10.

Other peripherals or associated equipment for the gaming device 10 include a bill/voucher acceptor 24 which reads and validates currency and vouchers for the player to establish credits for gaming on the gaming device 10 and one or more speakers 26 to provide audio to the player in association with the game play. To provide for communication between the gaming device 10 and a casino system, a player tracking module (PTM) 28 is mounted on the cabinet 12. PTM 28 has a PTM display 30 to display system related information to the player. The PTM display 30 may be a small LCD, plasma or OLED display with touch screen functionality. The mystery bonus game presentation(s) are displayed at the PTM display 30; however, as set forth below these presentations can be migrated to the primary or secondary displays 14, 18. A card reader 32 is provided to read a machine readable component on a player loyalty card issued to the player to identify the player to the casino system as in known in the art. A ticket printer 36 may be provided as well on the PTM 28 or elsewhere on the gaming device 10 to provide printed value ticket vouchers to players as is known in the art.

Some functionality of the PTM 28 may be provided by a video switcher and touch router device as is described in U.S. Pub. App. 2009/0149253 entitled "Video Switcher and Touch Router Method for a Gaming Machine" filed Jan. 8, 2009 and incorporated by reference. According to this disclosure system and externally based content including the mystery game presentations as hereinafter described may be displayed at one or more of the primary or secondary displays 14, 18 dispensing with the need for the PTM display 30.

While the player may use the buttons 20 to prompt play of the game (or the touch screen input), alternatively the player may use a handle 34, voice recognized commands, player gestures and eye movement to prompt an input as is known in the art.

Cabinet 12 may be a self-standing unit that is generally rectangular in shape and may be manufactured with reinforced steel or other rigid materials which are resistant to tampering and vandalism. Any shaped cabinet may be implemented with any embodiment of gaming machine 10 so long as it provides access to a player for playing a game. For example, cabinet 12 may comprise a slant-top, bar-top, or table-top style cabinet, including a Bally Cinevision™ or CineReels™ cabinet. The gaming device 10 may include a controller and memory disposed within the cabinet 12 or may have thin client capability such that some of the computing capability is maintained at a remote server.

The plurality of player-activated buttons 20 may be used for various functions such as, but not limited to, selecting a wager denomination, selecting a game to be played, selecting a wager amount per game, initiating a game, or cashing out money from gaming machine 10. Buttons 20 may be operable as input mechanisms and may include mechanical buttons, electromechanical buttons or touch screen buttons. In one or more embodiments, buttons 20 may be replaced with various other input mechanisms known in the art such as, but not limited to, touch screens, touch pad, track ball, mouse, switches, toggle switches, voice or gesture based commands or other input means used to accept player input.

For example, one input means is as disclosed in U.S. Pub. App. 2011/0111853, entitled "Universal Button Module," filed on Jan. 14, 2011 and/or U.S. Pub. App. 2010/0113140 entitled "Gesture Enhanced Input Device" filed Nov. 16, 2009 which are hereby incorporated by reference. Player input may also be by providing touch screen functionality at the primary game display 14 and/or secondary display 18.

The primary game display 14 may present a base game of chance wherein a player receives one or more outcomes from a set of potential outcomes. For example, one such game of chance is a video slot machine game. In other aspects of the disclosure, gaming machine 10 may present a video or mechanical reel slot machine, a video keno game, a lottery game, a bingo game, a Class II bingo game, a roulette game, a craps game, a blackjack game, a mechanical or video representation of a wheel game or the like.

To enable certain features and facilities of the present disclosure a digital camera (not shown) is mounted on the gaming machine 10 at a location to capture a biometric image of a player seated at the gaming machine 10 for play. For example, the digital camera may be mounted between the speakers 26 or on the PTM 28. The digital camera may be configured to capture images in its focal area or to capture images in its focal area when a player is detected at the gaming machine 10. Preferably the focal area for the digital camera is directed to capture the facial image of the player for the purposes of processing one or more images to passively approximate the age of the player. Where the device is, for example, a mobile device such as a Smart phone or tablet, those devices as well may include a digital camera for capturing the biometrical image of the user such as their face and eyes.

Figure 2A:
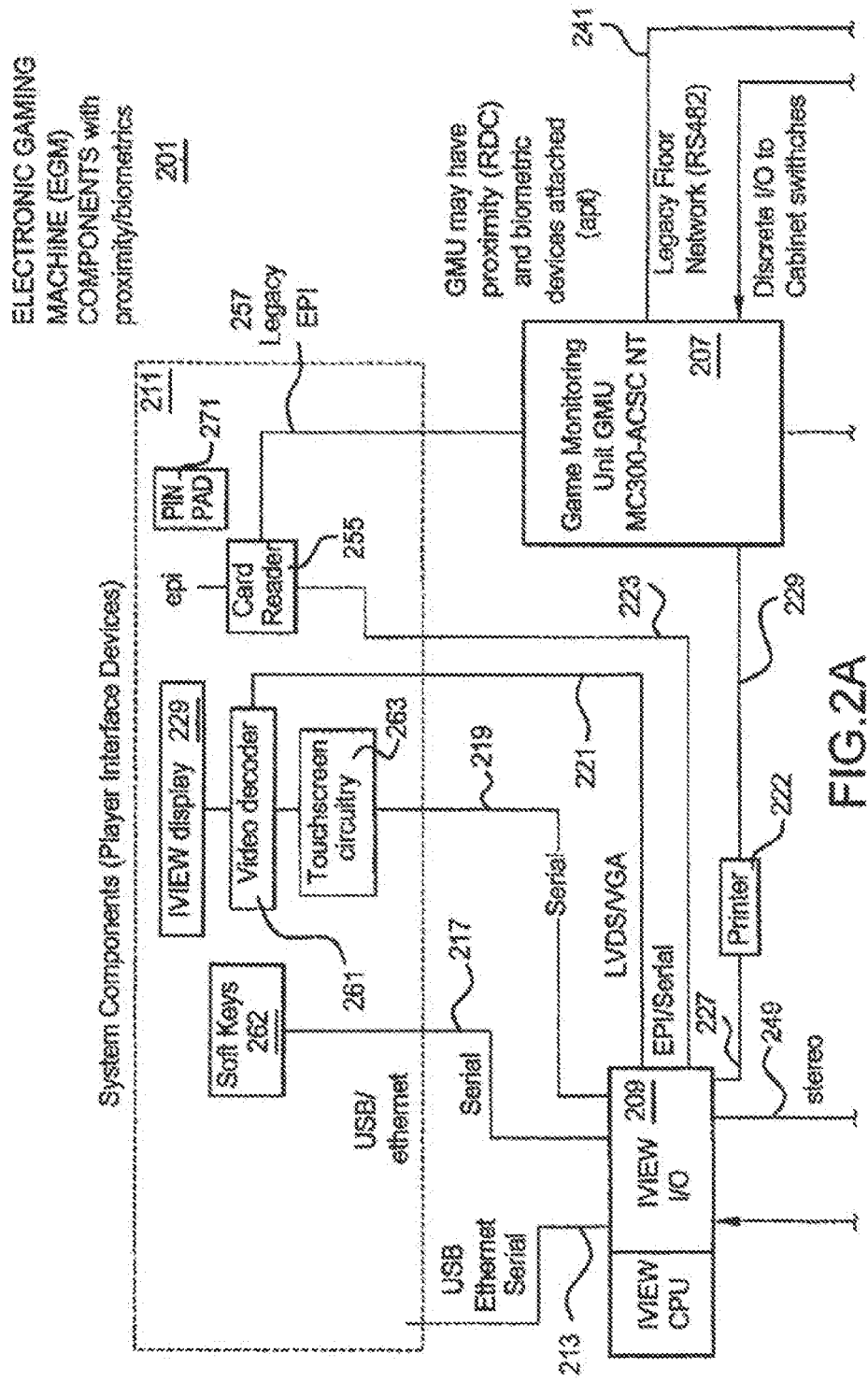
FIG. 2A illustrates an example of a gaming terminal operational platform and components for a gaming terminal of the type of the present disclosure.
Figure 2B:
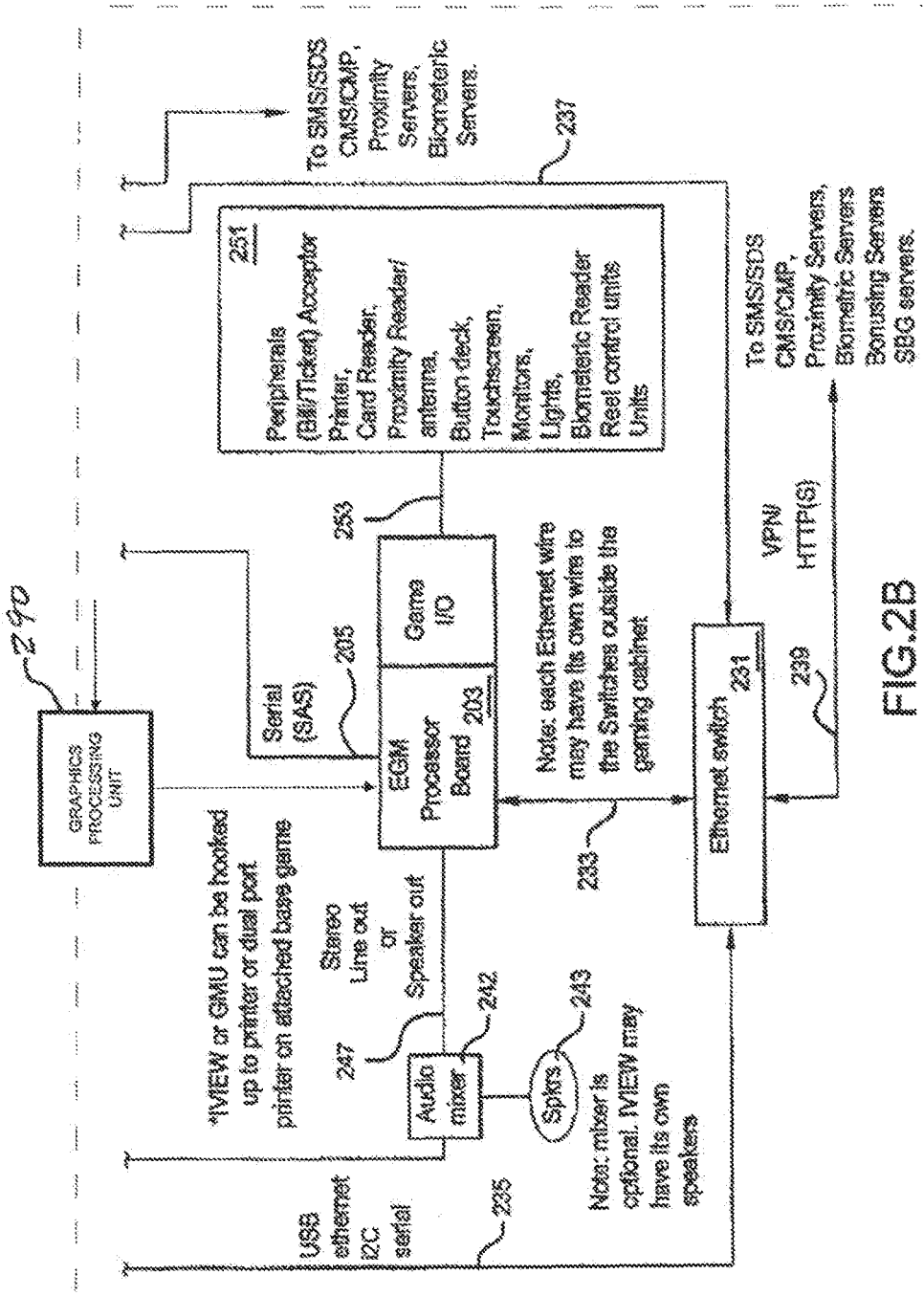
FIG. 2B illustrates an example of a gaming terminal operational platform and components for a gaming terminal of the type of the present disclosure.

Referring to FIGS. 2A, B, the gaming device 10 hardware 201 for the controller(s) is shown in accordance with one or more embodiments. The hardware 201 includes base game processor board 203 (EGM Processor Board) connected through serial bus line 205 to game monitoring unit (GMU) 207 (such as a Bally MC300 or ACSC NT manufactured and sold by Bally Gaming, Inc., Las Vegas, Nev.). EGM Processor Board 203 is connected to the player interface device PID 209 over bus line 249 and PID 209 is connected to the iView device such as 211 in FIG. 2A through bus lines 213, 217, 219, 221, 223. The PID 209 provides for communication between one or more gaming devices 10 and the casino system such as the type as hereinafter described. Inasmuch as gaming devices 10 may be manufactured by different entities, mounting like PTMs 28, 211 and PIDs 209 at each gaming device 10 provides for communication to the system in one or more common message protocols. Typically when a casino enterprise purchases a casino management system they also purchase the same manufacturer's PTMs 28, 211 and PIDs 209 which are then installed by the various manufacturers of the gaming devices 10 for the enterprise before delivery. In this manner the mountings for the PTMs 28, 211 on the gaming devices can be configured for location and esthetic appearance. Gaming voucher ticket printer 36 (for printing player cash out tickets) (shown as printer 222 in FIG. 2A) is connected to PID 209 and GMU 207 over bus lines 227, 229. EGM Processor Board 203, PID 209 and GMU 207 connect to Ethernet switch 231 over bus lines 233, 235, 237. Ethernet switch 231 connects to a slot management system and a casino management system (SMS, SDS, CMS and CMP) (FIGS. 4A, 4B) network over bus line 239. Ethernet switch 231 may also connect to a server based gaming server or a downloadable gaming server. GMU 207 also may connect to the network over bus line 241. Speakers 26 (shown as 243 in FIG. 2B) to produce sounds related to the game or according to the present disclosure connect through audio mixer 242 and bus lines 247, 249 to EGM Processor Board 203 and PID 209.

Peripherals 251 connect through bus 253 to EGM Processor Board 203. The peripherals 251 include, but are not limited to the following and may include individual processing capability: bill/voucher acceptor 24 to validate and accept currency and ticket vouchers, the player interfaces such a buttons 20, primary and secondary game displays 14, 18 and any secondary or tertiary displays (with/without) touch screen functionality, monitors, lights and one or more digital cameras. The peripherals 251 may include the displays as hereinafter described with reference to the various embodiments of the present disclosure as herein described or their equivalents. For example, the bill/voucher acceptor 24 is typically connected to the game input-output board of the EGM processing board 203 (which is, in turn, connected to a conventional central processing unit ("CPU") board), such as an Intel Pentium® microprocessor mounted on a gaming motherboard. The I/O board may be connected to CPU processor board 203 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. EGM processor board 203 executes a game program that causes the gaming device 10 to display and play a game. The various components and included devices may be installed with conventionally and/or commercially available components, devices, and circuitry into a conventional and/or commercially available gaming terminal cabinet 12.

When a player has inserted a form of currency such as, for example and without limitation, paper currency, coins or tokens, cashless tickets or vouchers, electronic funds transfers or the like into the currency acceptor, a signal is sent by way of bus 253 to the I/O board and to EGM processor board 203 which, in turn, assigns an appropriate number of credits for play in accordance with the game program. The player may further control the operation of the gaming machine by way of other peripherals 251, for example, to select the amount to wager via the buttons 20. The game starts in response to the player operating a start mechanism such as the handle 34, button 20 such as a SPIN/RESET button or a touch screen icon. The game program includes a random number generator to provide a display of randomly selected indicia on one or more displays such as the primary game display 14 as shown in FIG. 1. In some embodiments, the random generator may be physically separate from gaming device 10; for example, it may be part of a central determination host system which provides random game outcomes to the game program. Finally, EGM processor board 203 under control of the game program and OS compares the outcome to an award schedule. The set of possible game outcomes may include a subset of outcomes related to the triggering and play of a feature or bonus game. In the event the displayed outcome is a member of this subset, EGM processor board 203, under control of the game program and by way of I/O Board, may cause feature/bonus game play to be presented on the primary game display 14 and/or any secondary display(s) 18.

Predetermined payout amounts for certain outcomes, including feature game outcomes, are stored as part of the game program. Such payout amounts are, in response to instructions from EGM processor board 203, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In an embodiment, the remote storage device is housed in a remote server such as a downloadable gaming server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming terminal are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

GMU 207 includes an integrated circuit board and GMU processor and memory including coding for network communications, such as the G2S (game-to-system) protocol from the Gaming Standards Association, Las Vegas, Nev., used for system communications over the network. As shown, GMU 207 may connect to the card reader 32 (shown as 255 in FIG. 2A) through bus 257 and may thereby obtain player information and transmit the information over the network through bus 241. Gaming activity information may be transferred by the EGM Processor Board 203 to GMU 207 where the information may be translated into a network protocol, such as S2S, for transmission to a server, such as a player tracking server, where information about a player's playing activity may be stored in a designated server database. The GMU 207 may also facilitate retrieving of data from a player account to be provided to the EGM processor board 203 for, for example, obtaining data corresponding to the age of a player tied to the account.

PID 209 includes an integrated circuit board, PID processor (iView CPU), and memory which includes an operating system, such as Windows CE, a player interface program which may be executable by the PID 209 processor together with various input/output (I/O) drivers for respective devices which connect to PID processor and which may further include various games or game components playable on PTM 28, 211 or playable on a connected network server and PTM 28, 211 is operable as the player interface. PID 209 connects to card reader 32 (shown as 255 in FIG. 2A) through bus 223, player tracking display 30 (shown as iView display 229 in FIG. 2A) through video decoder 261 and bus 221, such as an LVDS or VGA bus.

As part of its programming, the PID 209 processor executes coding to drive player tracking display 30, 229 and provide messages and information to a player. Touch screen circuitry 263 interactively connects PTM display 30, 229 and video decoder 261 to PTM 28, 211 such that a player may input information and causes the information to be transmitted either on the player's initiative or responsive to a query. Additionally soft keys 262 connect through bus 217 to PID 209 and operate together with the player tracking display 30 to provide information or queries to a player and receive responses or queries from the player. PID 209, in turn, communicates over the CMS/SMS network through Ethernet switch 231 and busses 235, 239 and with respective servers, such as a player tracking server.

PTMs 28 are linked into the virtual private network of the system components in gaming terminal 10. The system components include the player tacking module 28 (e.g. Bally iVIEW® device) ("iView" is a registered trademark of Bally Gaming, Inc.), PID 209, EGM processing board 203 and game monitoring unit (GMU) processing board 207. These system components may connect over a network to the slot management system (such as a commercially available Bally SDS/SMS) and/or casino management system (such as a commercially available Bally CMP/CMS).

The GMU 207 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to installation on the system components.

The system components include the PTM 28 processing board (PID 209) and game monitoring unit (GMU) 207. The GMU 207, PID 209 and PTM 28 can be combined into one like the commercially available Bally GTM iVIEW device. This device may have a video mixing technology to mix the EGM processor's video signals with the iVIEW display onto the top box monitor or any monitor on the gaming device.

The PTM 28 may also interface with a switcher and router device of the type described above. In such case, instead of providing the PTM display 30, the switcher and router device provides for the content normally display at the PTM display 30 to be displayed at one or more of the primary or secondary displays 14, 18.

The gaming device 10 may also include a graphics processing unit (GPU) 290 configured to process the video/graphics content displayed at the gaming device 10 primary and secondary displays 14, 18. According to the present disclosure the GPU 290 and/or EGM Processor Board 203 will process the video and graphics content to adjust one or more of the content brightness, color temperature, vibrancy and/or color shift according to the determined age or approximate age and, in certain embodiments, as further adjusted by detected ambient conditions and as adjusted by the player or as dictated by a default protocol.

Figure 3:
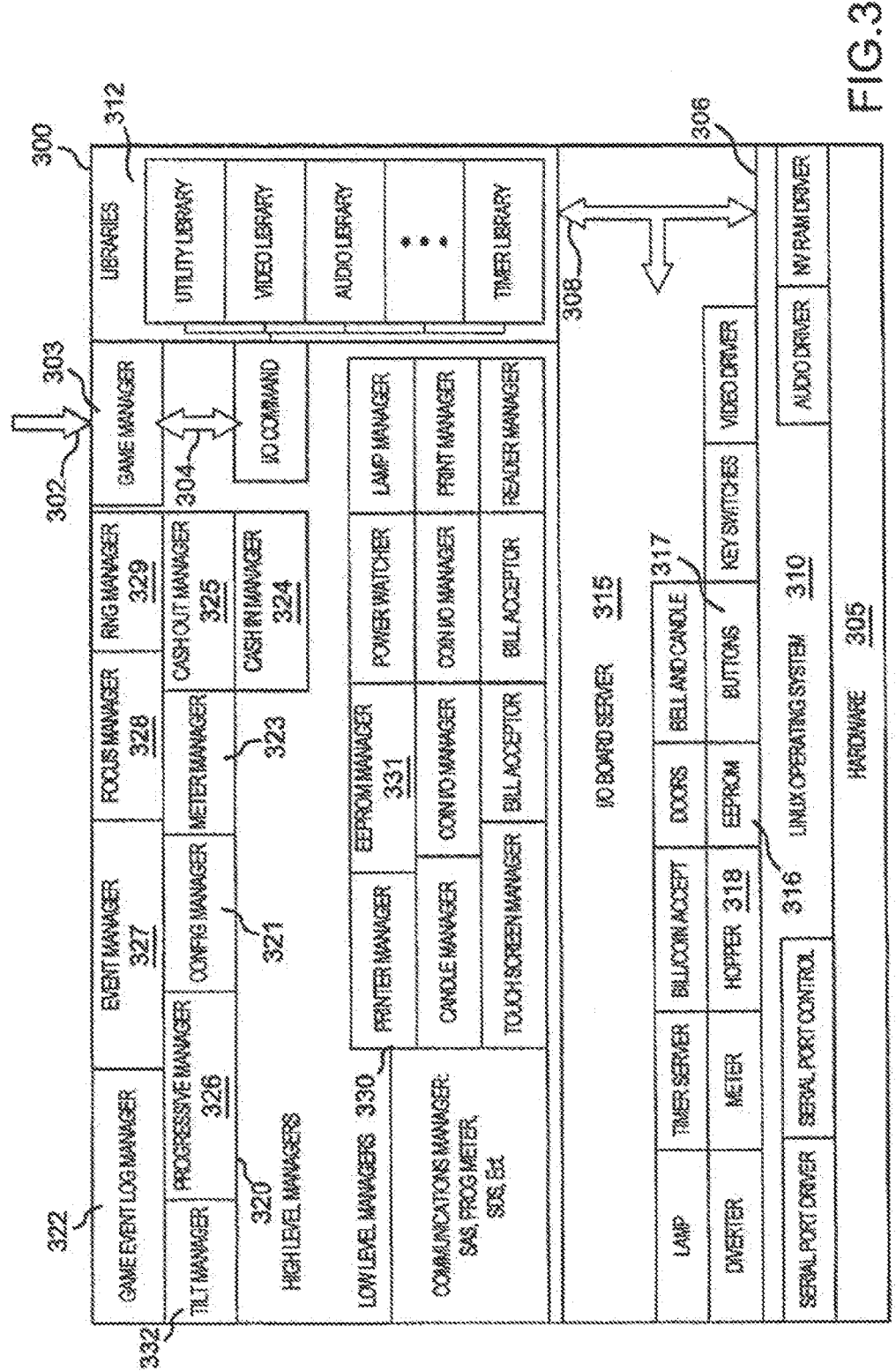
FIG. 3 is a block diagram of the logical components of a gaming kernel for a gaming terminal.

In accordance with one or more embodiments, FIG. 3 is a functional block diagram of a gaming kernel 300 of a game program under control of gaming device EGM processor board 203. The game program uses gaming kernel 300 by calling into application programming interface (API) 302, which is part of game manager 304. The components of game kernel 300 as shown in FIG. 3 are only illustrative, and should not be considered limiting. For example, the number of managers may be changed, additional managers may be added or some managers may be removed without deviating from the scope and spirit of the disclosure.

As shown in the example, there are three layers: a hardware layer 306; an operating system layer 308, such as, but not limited to, Linux; and a game kernel layer having game manager 304 therein. In one or more embodiments, the use of an operating system layer 310, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel 300 executes at the user level of the operating system layer 308, and itself contains a major component called the I/O board server 315. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in, the command is sent to an applicable library routine 312. Library routine 312 decides what it needs from a device, and sends commands to I/O board server 310 (see arrow 308). A few specific drivers remain in operating system layer 310's kernel, shown as those below line 306. These are built-in, primitive, or privileged drivers that are (i) general (ii) kept to a minimum and (iii) are easier to leave than extract. In such cases, the low-level communications is handled within operating system layer 310 and the contents passed to library routines 312.

Thus, in a few cases library routines may interact with drivers inside operating system layer 310, which is why arrow 308 is shown as having three directions (between library routines 312 and I/O board server 315, or between library routines 312 and certain drivers in operating system layer 306). No matter which path is taken, the logic needed to work with each device is coded into modules in the user layer of the diagram. Operating board server layer 306 is kept as simple, stripped down, and common across as many hardware platforms as possible. The library utilities and user-level drivers change as dictated by the game cabinet or game machine in which it will run. Thus, each game cabinet or game machine may have an industry standard EGM EGM processing board 203 connected to a unique, relatively dumb, and as inexpensive as possible I/O adapter board, plus a gaming kernel 300 which will have the game-machine-unique library routines and I/O board server 315 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 330, although lower level managers 330 may be accessible through game manager 304's interface if a programmer has the need. In addition to the freedom derived from not having to deal with the hardware level drivers and the freedom of having consistent, callable, object-oriented interfaces to software managers of those components (drivers), game manager 304 provides access to a set of high level managers 320 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 321 is among the first objects to be started; configuration manager 321 has data needed to initialize and correctly configure other objects or servers.

The high level managers 320 of game kernel 300 may include game event log manager 322 which provides, at the least, a logging or logger base class, enabling other logging objects to be derived from this base object. The logger object is a generic logger; that is, it is not aware of the contents of logged messages and events. The game event log manager's 322 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 323 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 323 receives its initialization data for the meters, during start-up, from configuration manager 321. While running, the cash in manager 324 and cash out manager 325 call the meter manager's 323 update functions to update the meters. Meter manager 323 will, on occasion, create backup copies of the soft meters by storing the soft meters' readings in EEPROM. This is accomplished by calling and using EEPROM manager 331.

In accordance with still other embodiments, progressive manager 336 manages progressive games playable from the game machine. Event manager 327 is generic, like game event log manager 327, and is used to manage various gaming machine events. Focus manager 328 correlates which process has control of various focus items. Tilt manager 332 is an object that receives a list of errors (if any) from configuration manager 321 at initialization, and during game play from processes, managers, drivers, etc. that may generate errors. Random number generator manager 329 is provided to allow easy programming access to a random number generator (RNG), as a RNG is required in virtually all casino-style (gambling) games. Random number generator manager 329 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 325 has the responsibility of configuring and managing monetary output devices. During initialization, cash out manager 325, using data from configuration manager 321, sets the cash out devices correctly and selects any selectable cash out denominations. During play, a game application may post a cash out event through the event manager 327 (the same way all events are handled), and using a call back posted by cash out manager 325, cash out manager 325 is informed of the event. Cash out manager 325 updates the credit object, updates its state in non-volatile memory, and sends an appropriate control message to the device manager that corresponds to the dispensing device. As the device dispenses dispensable media, there will typically be event messages being sent back and forth between the device and cash out manager 325 until the dispensing finishes, after which cash out manager 325, having updated the credit manager and any other game state (such as some associated with meter manager 323) that needs to be updated for this set of actions, sends a cash out completion event to event manager 327 and to the game application thereby. Cash in manager 324 functions similarly to cash out manager 325, only controlling, interfacing with, and taking care of actions associated with cashing in events, cash in devices, and associated meters and crediting.

In a further example, in accordance with one or more embodiments, I/O board server 315 may write data to the gaming machine EEPROM memory, which is located in the gaming machine cabinet and holds meter storage that must be kept even in the event of power failure. Game manager 304 calls the I/O library functions to write data to the EEPROM. The I/O board server 315 receives the request and starts a low priority EEPROM manager 331 thread within I/O board server 315 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 317 within I/O board server 315, polls (or is sent) the state of buttons every 2 ms. These inputs are debounced by keeping a history of input samples. Certain sequences of samples are required to detect a button was pressed, in which case the I/O board server 315 sends an inter-process communication event to game manager 304 that a button was pressed or released. In some embodiments, the gaming machine may have intelligent distributed I/O which debounces the buttons, in which case button module 317 may be able to communicate with the remote intelligent button processor to get the button events and simply relay them to game manager 304 via IPC messages. In still another embodiment, the I/O library may be used for pay out requests from the game application. For example, hopper module 318 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151 issued Apr. 1, 2008 entitled "Gaming Board Set and Gaming Kernel for Game Cabinets" the disclosure of which is incorporated herein by explicit reference.

Figure 4A:
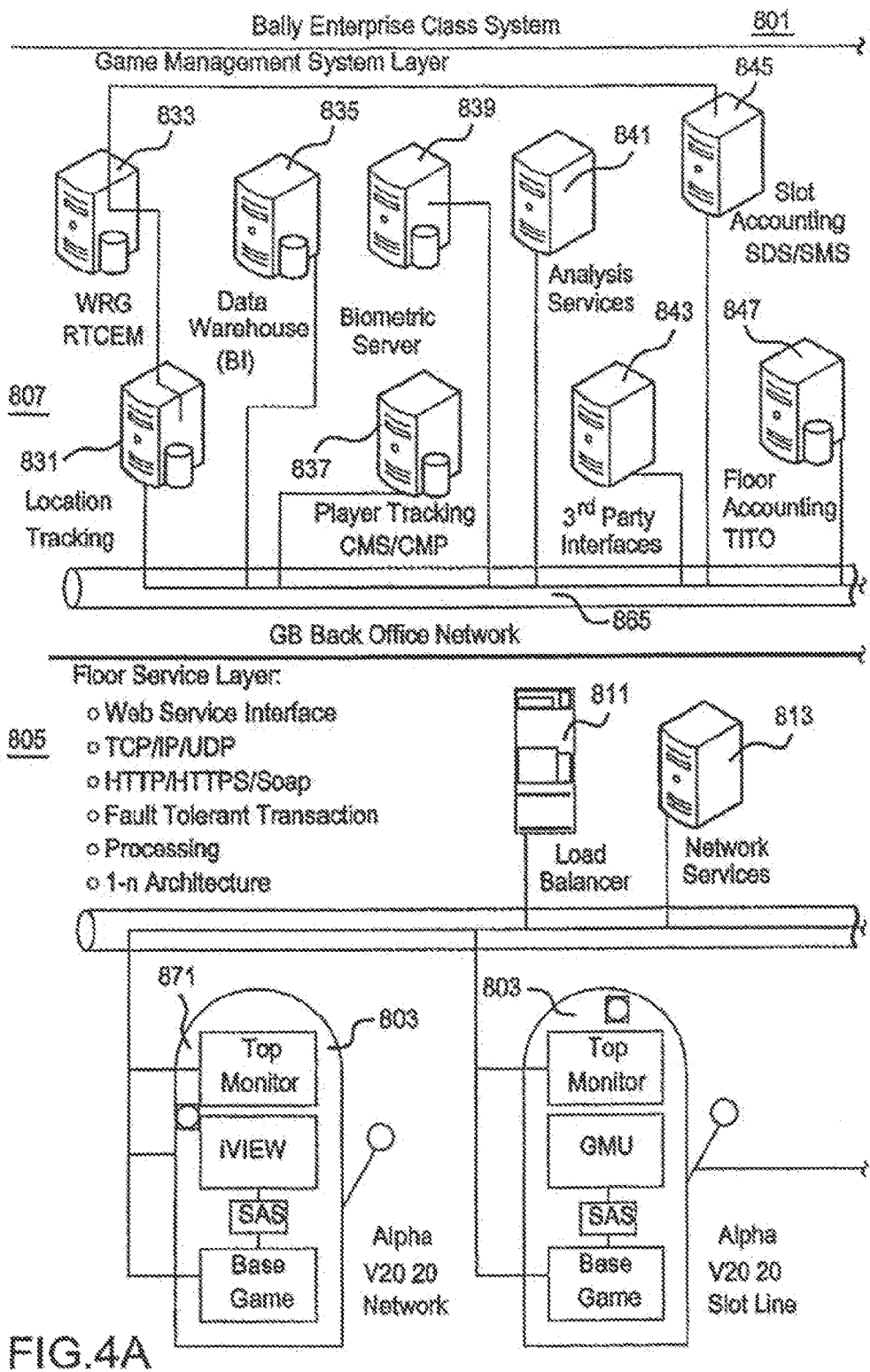
FIG. 4A is a schematic of an example of a casino enterprise network incorporating gaming terminals.
Figure 4B:
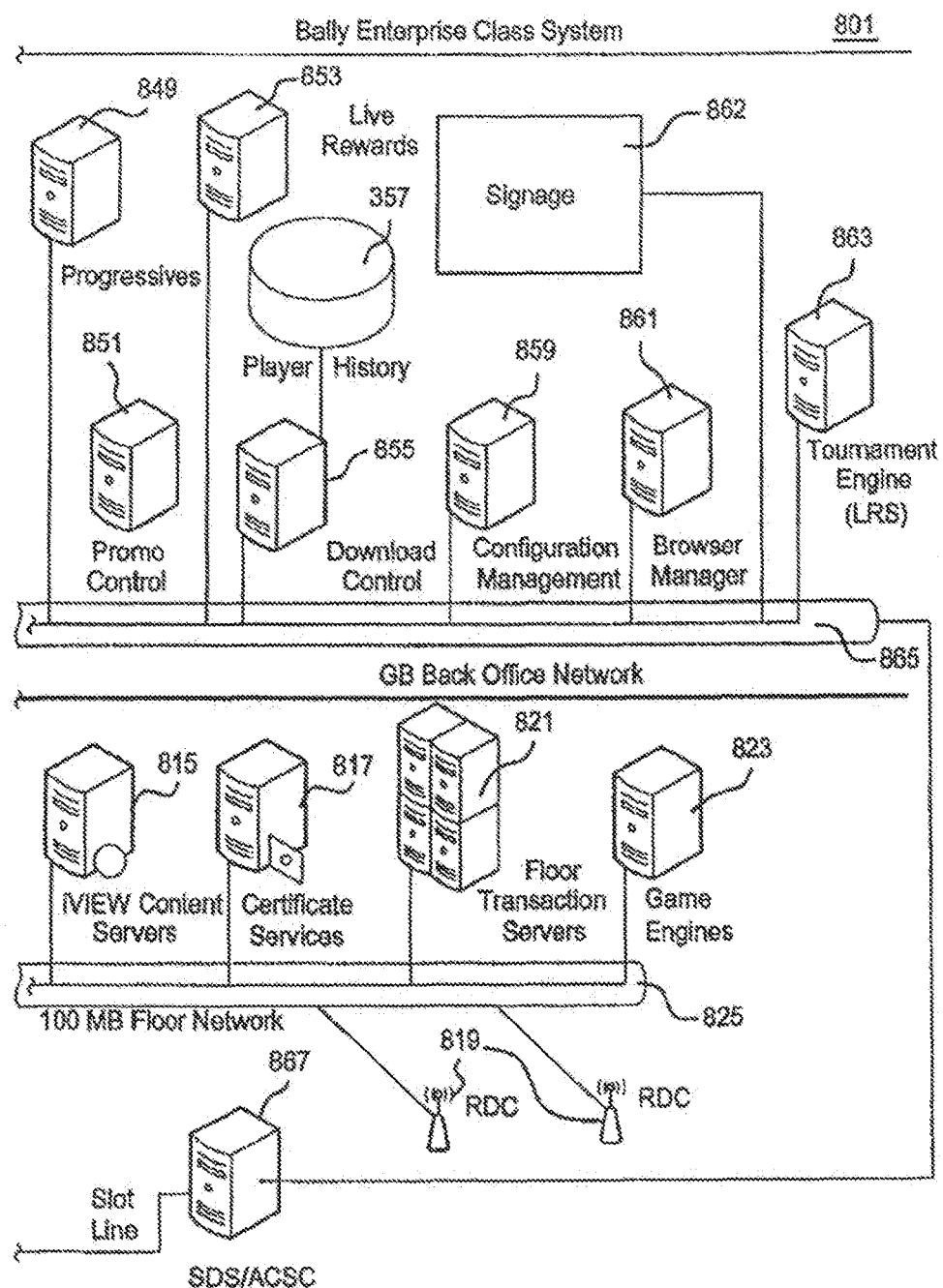
FIG. 4B is a schematic of an example of a casino enterprise network incorporating gaming terminals.

Referring to FIGS. 4A and B, an example of a gaming enterprise system 801 is shown in accordance with one or more embodiments. Gaming enterprise system 801 may include one casino or multiple locations (herein referred to collectively as a casino enterprise) and generally includes a network of gaming terminals 803 (including gaming devices 10 of the type as described in FIG. 1), floor management system (SMS) 805, and casino management system (CMS) 807. SMS 805 may include load balancer 811, network services server 813, player tracking module 28, iView (PTM 28), content servers 815, certificate services server 817, floor radio dispatch receiver/transmitters (RDC) 819, floor transaction servers 821 and game engines 823 (where the gaming terminals 803 operate server based, server supported or downloadable games), each of which may connect over network bus 825 to gaming terminals 803. CMS 807 may include location tracking server 831, WRG RTCEM (William Ryan Group Real Time Customer Experience Management from William Ryan Group, Inc. of Sea Girt, N.J.) server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming terminals 803. The various servers and gaming terminals 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming terminals 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions. One or more of the servers may control signage 862 in the venue to display various messages and information to the players.

The gaming terminals 803 include various peripheral components that may be connected with USB, serial, parallel, RS-485 or Ethernet devices/architectures to the system components within the respective gaming machine. The GMU (shown as GMU 206 in FIG. 2A) has a connection to the base game through a serial SAS connection. The system components in the gaming cabinet may be connected to the servers using HTTPs or G2S protocols over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming. The data and programming updates to gaming terminals 803 are authenticated using conventional techniques prior to install on the system components.

In various embodiments, any of the gaming devices 803 may be a video slot machine, video poker machine, video Bingo machine, video Keno machine, or a gaming device offering one or more of the above described games. Alternately, gaming devices 803 may provide a game with an accumulation-style feature game as one of a set of multiple primary games selected for play by a random number generator, as described above. A gaming enterprise system 801 of the type described above also allows a plurality of games in accordance with the various embodiments of the disclosure to be linked under the control of a group game server (not shown) for cooperative or competitive play in a particular area, bank of games, casino or between casinos located in geographically separate areas. For example, one or more examples of group games under control of a group game server are disclosed in Vallejo et al U.S. Published Application 2008/0139305, entitled "Networked System and Method for Group Gaming," filed on Nov. 9, 2007, which is hereby incorporated by reference in its entirety for all purposes.

The gaming enterprise system 801, among other functionalities such as slot accounting (i.e. monitoring the amount wagered ("drop"), awards paid) and other casino services, includes the player tracking CMS/CMP server 837 and/or data warehouse 835 storing player account data. This data includes personal data for players enrolled in the casino players club sometimes referred to as a loyalty club. An example of the personal data is the player's name, address, SSN, birth date, spouse's name and perhaps personal preferences such as types of games, preferences regarding promotions, player rating level, available player comp points (points accumulated based upon commercial "spend" activity with the enterprise including gaming and which may be redeemed or converted into cash or merchandise) and the like. As is known in the industry and according to the prior art, at enrollment the player is assigned a created account in the player tracking CMS/CMP server 837 and is issued a player tracking card having a machine readable magnetic stripe. During enrollment a player would provide their demographic information including their data of birth. Additionally or alternatively the player would provide an identification instrument such as a driver's license which also includes the player's date of birth.

When a player plays a gaming device 10 (or terminal 803) (hereinafter collectively referred to as gaming devices 10), he/she inserts their player tracking card into the card reader 32 (FIG. 1) which communicates data to the CMS/CMP server 837 to accumulate loyalty ("comp") points based upon the wagers/wins of the player. For example, a player may accumulate one comp point for each $5 wagered. Comp points may also be awarded as part of a promotion and for other commercial activity such as the purchase of goods or services. Insertion of the player card also provides access to the player's account data including age information for the purposes of the present disclosure.

The system 801 may also include electronic transfer of funds functionality. For example, a player having accumulated $100 at a gaming terminal 10 may decide to "cash out" to play another gaming terminal 10. The player, for example using the PTM 28 to initiate communication with the system 801 for example server 837 to upload the value from the gaming terminal 10 into an electronic account associated with the player's account. The player may choose to upload all or a portion of the funds the player's established electronic account. The system would prompt the player to enter their PIN (or obtain biometrical confirmation as to the player's identity) and upload the chosen amount to their account. When the player moves to another gaming terminal 10 he/she inserts their player loyalty card into the card reader 32 to access their account. A prompt provides for the player to request funds from their account. Entering their PIN (or biometric identifier) the player can input the desired amount which is downloaded to their gaming terminal 10 for play.

Figure 5:
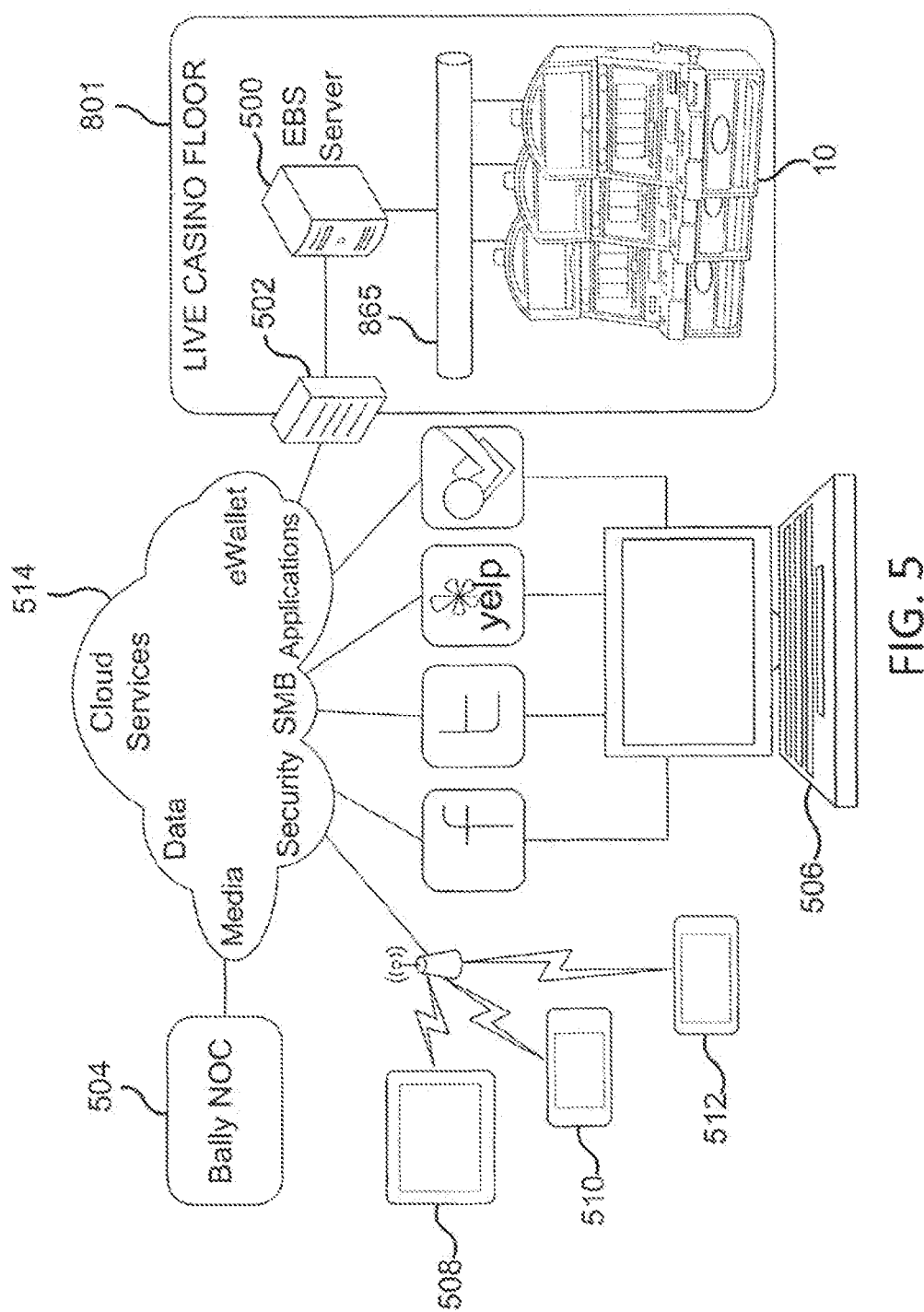
FIG. 5 is a diagram showing an example of an architecture for tying a casino enterprise network to an external provider of games and content to Internet or broadband communication capable devices.

All or portions of the present disclosure may be implemented or promoted by or through a system as suggested in FIG. 5. At 801 is the gaming enterprise system which may be hosted at a casino property enterprise, across several casino enterprises or by a third party host. As described above the gaming enterprise system 801 has a network communication bus 865 providing for communication between the gaming devices 10 and various servers as described above with respect to FIGS. 4A,B. To provide the functionality illustrated in FIG. 5, a feature server 500, such as a Bally Elite Bonusing Server, is connected to the network communication bus 865 for communication to the gaming enterprise system 801, the gaming devices 10 and the various servers and other devices as described above. Through a secure network firewall 502 the feature server 500 is in communication with a cloud computing/storage service 514 which may be hosted by the casino enterprise, a licensed third party or if permitted by gaming regulators an unlicensed provider. For example the cloud service 514 may be as provided by Microsoft® Private Cloud Solutions offered by Microsoft Corp. of Redmond, Wash., USA. The cloud service 514 provides various applications which can be accessed and delivered to, for example, personal computers 506, portable computing devices such as computer tablets 508, personal digital assistants (PDAs) 510 and cellular devices such as telephones and smart phones 512. For example the cloud service 514 may provide and support the enterprise applications in association with the feature server 500. The cloud service 514 may also facilitate the delivery of downloadable software applications and content to user/players by supporting updates and advertising through the enterprise applications to the remote device user/player. The cloud service 514 includes security provide for secure communication with the cloud service 514 between the player/users and the cloud service 514 and between the cloud service 514 and the gaming enterprise system 501. Security applications may be through encryption, the use of personal identification numbers (PINS), biometric identification, location determination or other devices and systems. As suggested in FIG. 5 the cloud service 515 stores or accesses player/user data retrieved from players/users and from the gaming enterprise system 501 and feature server 500.

The players/users may access the cloud service 514 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace or LinkedIn or the like.

As but an example, a player/user may have a player account with a casino enterprise. That account may include data such as the player's credit level, their rating, demographic information including age and their available comps. At their smart phone 512 the player/user sends a request to the cloud service 514 (perhaps through a previously downloaded application) to request a the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN or some other unique identifier such as a biometric identifier or tag. The cloud service 514 forwards the inquiry to the feature server 500 which, in turn, confirms the identification and retrieves the requested information from the data warehouse 835 or player history database 857 or player tracking CMS/CMP server 837. The information is formatted by the cloud service 514 application and delivered to the player/user. The delivery may be formatted based upon the player/user's device operating system (OS), display size or the like.

The cloud service 514 may also host game applications to provide virtual instances of games for free, promotional, or where permitted, P2P (Pay to Play) supported gaming Third party developers may also have access to placing applications with the cloud service 514 through, for example a national operations center (Bally NOC 504). A game software manufacturer such as Bally Gaming, Inc. may also provide game applications on its own or on behalf of the casino enterprise.

Other media such as advertising, notices (such as an upcoming tournament) promotions and surveys may also be provided to and through the cloud service 514. When a player/user accesses the cloud service 514 certain media may be delivered to the player/user in a manner formatted for their application and device.

The cloud service 514 enables the casino enterprise to market to and foster player loyalty. To drive such interaction various incentive programs may be employed including, as described above, users earning or being awarded mystery game chances which may be redeemed at their next visit to the casino enterprise or, where permitted, during play on their remote devices.

The gaming devices 10 may also be configured to support server-based or server supported gaming. In such instances some or all of the gaming processing would take place at a server with the local gaming device 10 being a terminal to provide the graphic displays and accept the player's input.

Figure 6:
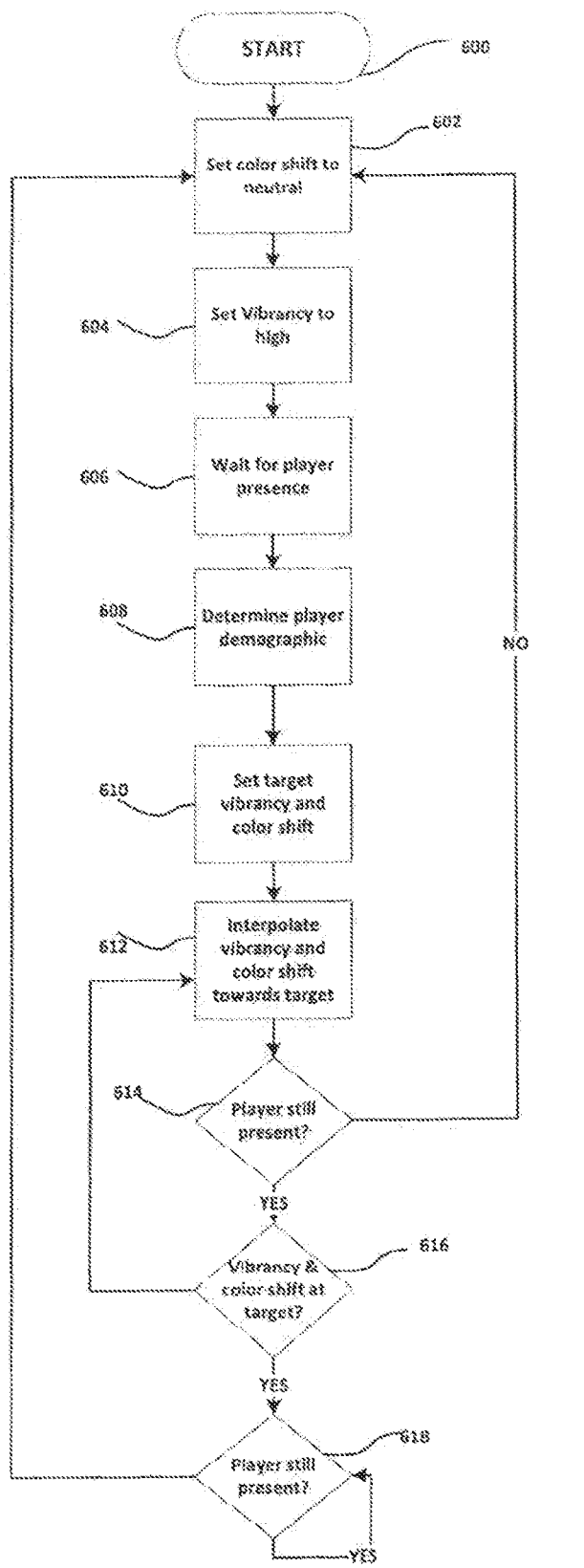
FIG. 6 is a process diagram showing the operation of an embodiment of the disclosure for a player of a gaming device.

In an embodiment of the present disclosure as applied to the gaming environment, referring to FIG. 6 at 600 the gaming device 10 is started such as by the booting-up the gaming device 10. At 602 one or more of the GPU 290 and EGM Processor Board 203 set the color shift to a default condition such as a condition where little or no adjustment to the brightness, or color shift applied to the original content and at 604 sets the vibrancy to high. In a default condition vibrancy is set to high to attract passersby to play the gaming device 10. In an alternative or additional embodiment all of the brightness, color shift and vibrancy are as dictated by the original content. It should be understood that continuous presentation at high vibrancy may be applied; however it is believed to be disadvantageous to continuously use high vibrancy inasmuch as the same may cause eye strain and fatigue. At 606 the gaming device 10 waits for detection of a player. At step 608 a facility at the gaming device 10 (or system) detects the presence of a player and determines the player's demographic, i.e. player's age. The facility may be a digital camera detecting the presence of a player at the gaming device 10, the player inserting cash or a voucher/ticket at the validator 24 or the player inserting their issued loyalty card into the card reader 32.

The determination of at least the player's approximate age can be determined by the facility by various techniques. One technique, where the player has used their loyalty card (or other instrument such as a wireless fob), is to access the player tracking server 837 and data warehouse 835 to access the player's account and retrieve data representing the player's age. Another technique is for the gaming device 10 and/or system 801 to identify the player and access an external source such as a credit card database, frequent flyer card database or the like. This technique may require the player to swipe their credit card or provide identifying data.

Another technique for the facility is for the player, at the gaming device 10, to offer up identification instrument such s a driver's license or passport for scanning such as by the digital camera or optical reader. Yet another technique is to passively capture a biometric image of the player by the digital camera for processing the data to at least estimate the player's age. As set forth above this technique may include obtaining one or more digital images of the player's face and processing those images according to software such as the SHORE™ software product from Fraunhofer Institute for Integrated Circuits, Am Wolfsmantel 33, 91058, Erlangen, Germany from which the age of a subject can be estimated based upon a captured image of the subject's face and eyes. This technology is touted as being able to estimate the age with a mean absolute error of 6.85 years. One or more other biometric software analytical products may be used to produce comparable results. Yet another technique is to request the player input their age at the gaming device 10 and/or PTM 28 or request that the player select their age group, e.g. 21-35, 36-50, 51 and over.

Based upon the data representing at least the approximate age of the player at 610 one or more of the vibrancy, brightness and color shift for the displayed content is adjusted. For performance reasons the setting of color shift and vibrancy would be done by pixel shaders on the GPU 290. The reason for this is by use of languages such as OpenCL or CUDA, many pixels could be adjusted in parallel. It can be seen that each pixel would have no dependencies on other pixels, so this adjustment would be highly suitable for SIMD or VLIW architectures found in modern graphics cards. To perform a color shift, one possible method would be to convert each pixel into CIE 1931 (International Commission on Illumination) color space (http://en.wikipedia.org/wiki/CIE_1931_color_space), increase the Z value by a selected factor and then convert the pixel back into RGB (red-green-blue) space for rendering. Assuming the content had been designed with Adobe RGB (1998) working space, conversion to (X, Y, Z) space would be performed by the following matrix (taken from http://www.brucelindbloom.com/index.html?Eqn_RGB_XYZ_Matrix.html).

$$\begin{pmatrix} X \\ Y \\ Z \end{pmatrix} = \begin{pmatrix} 0.5767309 & 0.1655540 & 0.1881852 \\ 0.2973769 & 0.6273491 & 0.0752741 \\ 0.0270343 & 0.0706872 & 0.9911085 \end{pmatrix} \begin{pmatrix} R \\ G \\ B \end{pmatrix}$$

As can be seen by the third row of the matrix, the Z value is quite approximate to blue, but Z is in fact proportional to the short wavelength sensitivity (S) of the cone cells of the eyes. Thus, according to Berman, increasing this value increases perception of brightness, which reduces pupil size and in turn increases resolution of contrast, depth of field and acuity.

After Z is increased by a suitable factor (how this factor is determined will be described below) the (X, Y, Z) values are transformed back into RGB values by the following inverse matrix:

$$\begin{pmatrix} R \\ G \\ B \end{pmatrix} = \begin{pmatrix} 2.0413690 & -0.5649464 & -0.3446944 \\ -0.9692660 & 1.6760106 & 0.0415560 \\ 0.0134474 & -0.1183897 & 1.0154096 \end{pmatrix} \begin{pmatrix} X \\ Y \\ Z \end{pmatrix}$$

Another step before and after these transformations would be necessary if the pixel (R, G, B) values were in the range of (0 . . . 255) rather than (0 . . . 1.0) which would be to appropriately scale the values by first dividing by 255 before the first transformation and multiplying by 255 after the second transformation.

To perform a vibrancy adjustment the technology supplied by eeColor could be used. In broad terms this would work similar to the color shift method, except that a transformation into HSV color space would take place, the S parameter would be increased according to a non-linear scale function or look up table, then the HSV value would be transformed back into RGB values. The non-linear scale function would be such that above certain levels of saturation little or no increase was made.

Once a player has begun playing, which can be determined by cash-in, card-in or facial presence detection, optimally the player age demographic is determined by methods described above. This estimation or accurate identification of age is used to determine the amount of target color shift. A suitable color shift may be used by taking the age of the player and putting it into a function, along with a maximum color shift, minimum color shift, and minimum age (presumably 21 in US legal jurisdictions). It had been previously thought that color shifts in a linear fashion as age increases, but more recent research such as shown that after the age of 60 (see Porkony, reference above) the rate increases almost threefold. Porkony also describes a lens optical density function for both between ages of 20 and 60, and for over the age of 60. These functions can be used to compute the target color shift, preferably in combination with the use of suitable focus groups of different age groups to fine tune values. In the preferred implementation the target vibrancy is zero, to bring colors back to the 'as-designed' state for long-term play. At this point of the gaming device will smoothly adjust the both the brightness, color shift and vibrancy to the target values. This smoothness can be achieved by interpolating over a period of time (for example, 2 minutes) between the initial color shift/vibrancy values and the final target values. The effect to the player would be expected to be so subtle as to be unnoticeable. Without the interpolation step the change may be to disconcerting, so this is an important feature of the disclosure.

Figure 9:
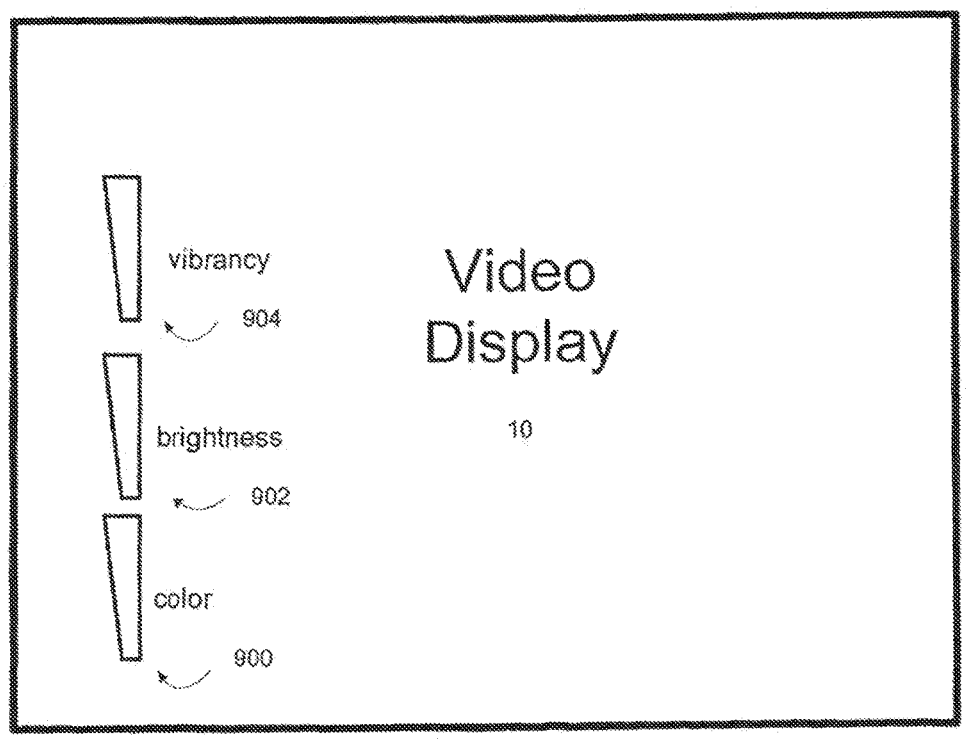
FIG. 9 illustrates a video display including touch screen slide buttons for user input.

As an alternative to interpolation, the player may be presented with one or more user interface buttons or stored preference to enable or disable "enhanced color". The effect of this button when pressed (or if, for example a touch screen slide button, moved) would be to set vibrancy and/or color shift to either target values or default values. Importantly, while this button would appear to perform the same function for all players, the target values of color shift would be set by age demographic and would the result of pressing this button would vary from player to player. For example, in FIG. 9 there is shown some examples of touch screen slider buttons 900, 902, 904 by which the user may adjust the color shift, brightness and vibrancy.

Another value that may be used to affect brightness, vibrancy and color shift would be the ambient lighting of the casino. As noted by Berman above, a lower light environment causes greater pupil size and thus reduced visual performance of the eye. By reading the ambient light using the camera, and adjusting such that lower ambient light leads to an increased color shift, a better, more easier to read display of gaming content may be achieved.

While gaming machines generally stay in one location and ambient lighting thus does not change much, it can be seen that if this disclosure were to be implemented on a mobile device, dynamically adjusting color shift and vibrancy to take into account the constant change of lighting conditions in real time would be possible.

Where a digital camera is provided at the gaming device 10 the setting of the one or more of vibrancy, color shift and brightness may also take into account the ambient lighting surrounding the player. For example, if the player and gaming device 10 are in a darkened area of a casino the settings may be attenuated whereas if the ambient lighting is bright these settings may be enhanced. Vibrancy is used to brighten the hue of one or more certain colors. As discussed above as humans mature and their eye lenses increase in density and because the lens thereby absorbs more strongly in the UV and short-wavelength region this leads to less discrimination between blue and green colors. Hence the GPU 290 and/or EGM Processor Board 203, where the player is determined to be older, would enhance the vibrancy of the blues and greens for a better presentation of the content to the player. Software for enhancing vibrancy is available from eeColor and others. By providing a color shift, in an embodiment, where the player is determined to be elderly, the colors may be shifted toward the longer wavelength ("reds") to account for a red shift phenomenon attributed, as discussed above, to a greater loss of sensitivity of shorter wavelengths at photoreceptors (cones) in the retina with age. Again brightness can be adjusted as well to brighten the colors (as adjusted) for elderly players and/or where the environment is well lit.

Continuing with FIG. 6, at 612 interpolates the characteristics of one or more of vibrancy, color and brightness based upon any adjustments such as where the digital camera and age determination software adjusts the age. Adjustments can also be made, as discussed above, based upon changes in the environment lighting.

A determination is made at 614 as to whether the player is still present at the gaming device 10. If no player is detected the GPU 209 and/or EGM Processor Board 203 returns to a default condition of the settings of brightness, color shift and vibrancy at 602. Absence of the player may be determined by the credits of the gaming device 10 being at "0" for a period of time, the player cashing out from the gaming machine 10 and no play prompted for a period of time and/or the player removing their player loyalty card from the card reader 32. Presence or absence may also be determined, where provided, by the camera. Preferably camera may capture images at least periodically to determine player presence as well as to update the image used for age determination. The process may be iterative repeatedly making the age determination and applying any adjustments. Where a player has overridden the adjustments the iterations may be suspended until a new player is detected. Further a player's adjusted settings may be stored in an account associated with the player such as their loyalty account for future reference and/or application to other gaming devices 10. If the player is deemed to be still present the iterative process continues at 616 to adjust the settings of brightness, color shift and vibrancy. At 618 the process continues to test to determine if the player is present and if not to return the settings to a default mode. If the player is still present the iterative process continues (unless overridden by the player).

The default or "neutral" settings for the brightness, vibrancy and color shift settings may include a plurality of settings. For example, where it is determined that no player is present for a period of time, the settings may be placed in the attract mode to highlight vibrancy and brightness. The default settings may be based upon different detected ambient conditions as well. A motion detector (or the digital camera) may also detect when players are in the vicinity of the gaming machine and if so shift to a high vibrancy and brightness and if not scale back those settings.

The default settings and adjustments to the at least one of the brightness, color shift and vibrancy may be controlled by the EGM processor board 203 or by a separate graphics processor unit 290 which may be original equipment or an aftermarket add-on.

For embodiments which include both a digital camera and the player uses a loyalty card, both age determination techniques can be used and any discrepancy resolved according to predefined rules. For example, a loyalty card may indicate that the player is twenty-four whereas the biometric data from the facial image captured by the camera indicates that the player is sixty-five. This "conflict" may be due to error or may be due to the player using someone else's player loyalty card. The conflict resolution rules may apply the biometrically determine age for adjustment of the content presentation.

Figure 7:
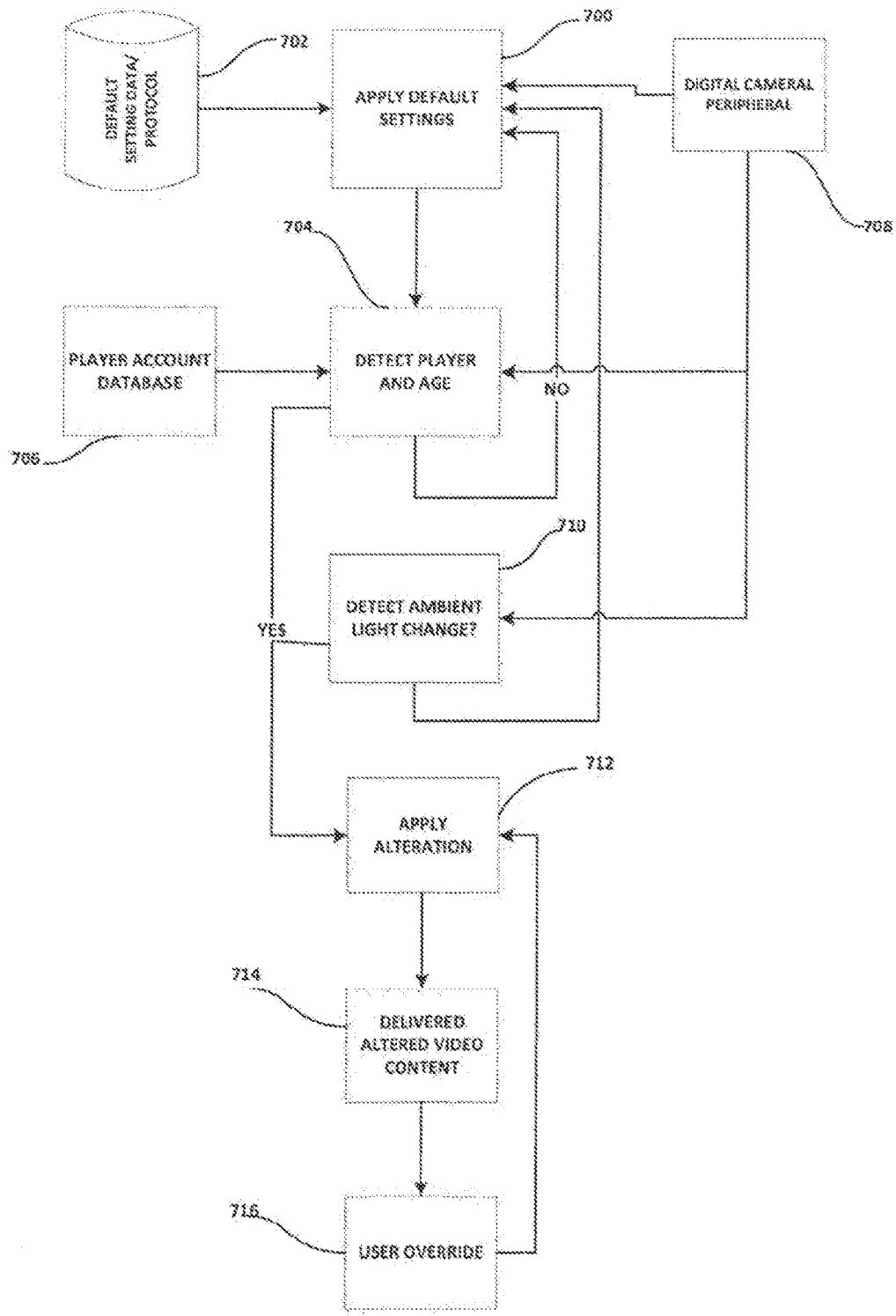
FIG. 7 is a process diagram for an embodiment of the disclosure which takes into account ambient lighting conditions.

FIG. 7 shows another process for the preset disclosure where sources can be accessed to determine the player's age as well as using the digital camera and image processing software. At 700 the GPU 209 and/or EGM Processor Board 203 assume a default settings condition of brightness, color shift and vibrancy as described above. A data structure 702 stores one or more default settings and the protocols for applying the settings as suggested above. The process includes at 704 detecting the presence of a player and at least an approximate age. This process step may include retrieving data from a player account database 706 and/or receiving and processing, in the manner described above, a digital image of the player captured by a digital camera peripheral 708. In an embodiment a likely demographic associated with the content can also be used to apply an adjustment. For example, if the content is more likely to be viewed by an older demographic, then an adjustment can be applied. Applying the "likely demographic" determination may be applicable where the user's age cannot be actively pr passively determined One environment for such an application may be in cable or broadcast television programming of older color programming more likely to be viewed by older people. If no player is detected or an approximate age cannot be determined the process retains the default setting. At 710 the process may also include a determination of changes to the ambient lighting conditions at the display and player. This may be done by the digital camera peripheral step 708 or a lighting setting may be encoded and fixed when the gaming device 10 is installed. If there is no change in ambient lighting conditions and not player is detected the process returns to the default, neutral settings at 700. If at 704 a player is detected and their at least approximate age is determined, at 712 the adjustment of one or more of brightness, vibrancy and color shift is applied. It should be noted that the determination of the player's age may result in retention of the default setting if the age determination results in no adjustment. Further, if the ambient lighting conditions have changed, this too may result in an adjustment of one or more of brightness and vibrancy of the display. Where there is a conflict between adjustments as a result of the player's age and ambient conditions rules for resolution may be adopted such as giving primacy to the adjustments based upon age. Look-up table may be established to determine the adjustments based upon player age, ambient conditions and other factors such as the content. For example, if the content is a video recording, no adjustment may be applied to preserve the original impression of the video and minimize processing delays.

At 714 the content altered by the adjustments of one or more of brightness, vibrancy or color shift is delivered to the display for presentation to the player through the GPU 290 and/or EGM processor Board 203. The object of applying these adjustments is to enhance the viewing of the content to the player. In an embodiment the gaming device 10 may be provided with one or more buttons or touch screen controls for the player to override the adjustment(s) or modify the adjustments to the player's liking at 716 as described above. For example slider buttons 900, 902, 904 (FIG. 9) may be displayed at the primary display 14 which can be manipulated by the player to increase/decrease brightness, vibrancy and/or color shift. In an embodiment where the player is using a loyalty card the adjustments may be saved in the player's file to be applied in the future to other gaming devices 10.

Figure 8:
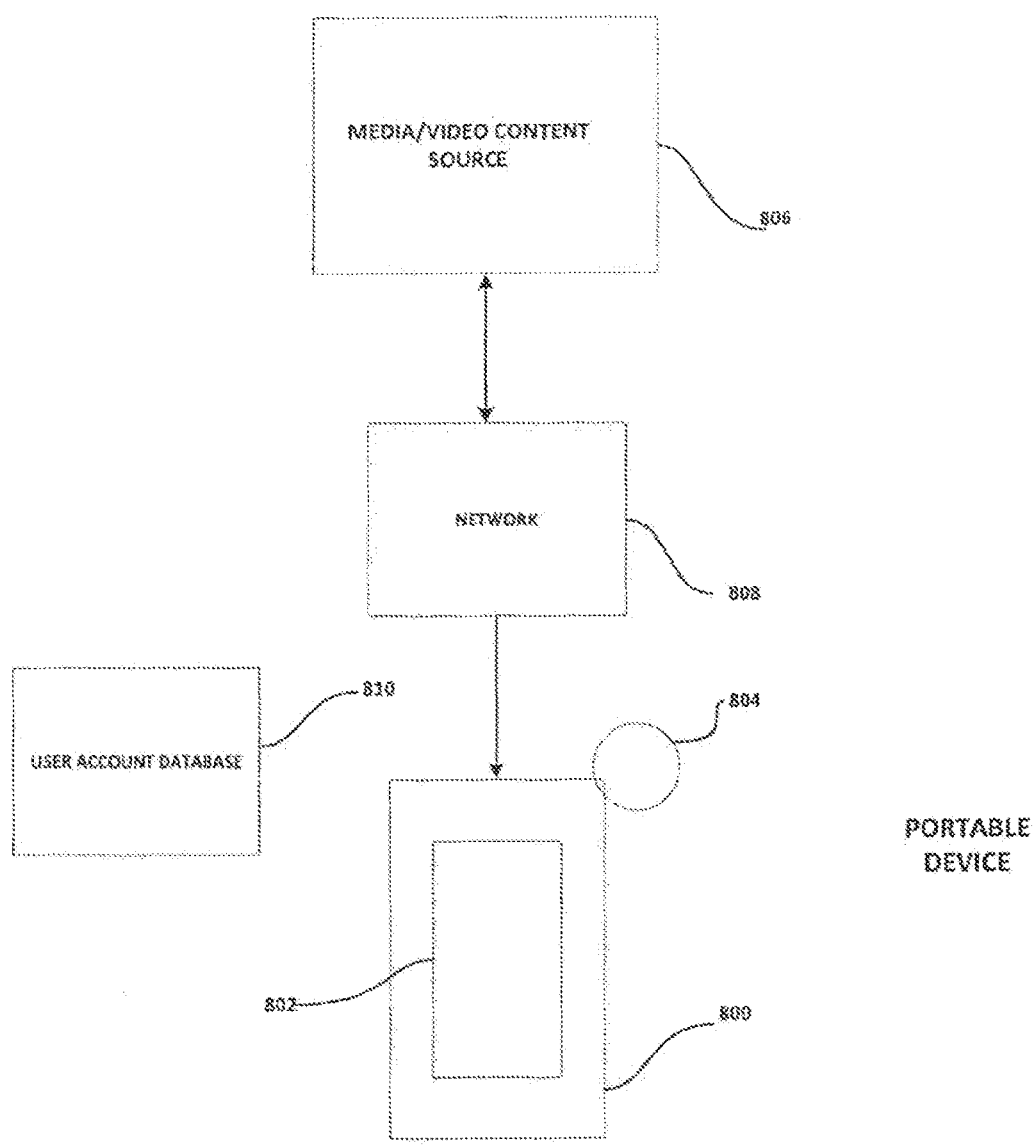
FIG. 8 illustrates an embodiment of the disclosure for use outside of gaming and for mobile devices.

FIG. 8 shows an embodiment of the present disclosure where content delivered to a remote, portable device 800 such as a smart phone, tablet computer, personal computer or other such device. The portable device has a display 802 as is known in the art. The portable device 800 may be equipped with a digital camera 804 directed toward the user as is also known in the art.

A media/video content source 806 is a repository for streaming content or downloadable content such as applications, games, graphics or the like. The user of the portable device 800, through a network 808 such as the Internet or broadband communications makes communication with the source 806 and requests content, for example, a game. The portable device 800 or the source 806 engages an application facility to determine at least an approximate age of the user. This may be done by accessing the user's account database 810 which includes data such as the user's birth date from which their current age can be determined. The account database 810 may be the user's broadband account or a credit card or other account or may be stored in a memory associated with the device or network. Additionally or alternatively the user may use the camera 804 (or the portable device 800 may be controlled by a downloaded application) to take an image of the user's face. Using one or both of the techniques of accessing the user's data or captured biometric information or based upon an age input from the user in response to a prompt ("How old are you?") the portable device 800 and/or the source 806 applies the adjustment, if required, to one or more of brightness, vibrancy or color shift to better preset the content to the user. As above, the user may have adjustment overrides through touch screen or electro-mechanical buttons. Further as described above ambient conditions may be taken into account to make the adjustment. The ambient conditions may be acquired by the camera 804. Further the application of the adjustment may be configured by the application to be smoothly applied over time so that the user is not startled by the adjustment.

The foregoing description, for purposes of explanation, uses specific nomenclature and formula to provide a thorough understanding of the disclosure. It should be apparent to those of skill in the art that the specific details are not required in order to practice the disclosure. The embodiments have been chosen and described to best explain the principles of the disclosure and its practical application, thereby enabling others of skill in the art to utilize the disclosure, and various embodiments with various modifications as are suited to the particular use contemplated. Thus, the foregoing disclosure is not intended to be exhaus-

We claim:

1. An apparatus with a video display for displaying video content to a user, the apparatus comprising:
a processor that is configured to execute instructions from a memory that cause the processor to:
receive age data of at least an approximate age of the user from a facility;
receive, via a digital camera, ambient light level data;
adjust brightness, vibrancy, and color shift for the video content displayed at the video display based upon the at least approximate age of the user, wherein the vibrancy and color shift are adjusted using pixel shaders on a graphics processing unit; and
adjust the brightness, the vibrancy, and the color shift for the video content displayed at the video display based upon ambient light data, wherein lower ambient light level results in an increased color shift and vibrancy.

2. The apparatus of claim 1, wherein the facility is a camera disposed to provide image data corresponding to the capture a facial image of the user and the processor is configured for determining the age data from the facial image data.

3. The apparatus of claim 1, further comprising a controller for a user to control the processor to adjust at least one of the brightness, the vibrancy and a color shift for the content displayed at the video display.

4. The apparatus of claim 1, wherein the facility includes an interface for retrieval of the age data from a data structure storing the age data.

5. The apparatus of claim 1, further comprising a memory device storing one or more default settings for at least one of the brightness, the vibrancy and a color shift and conditions at which the default settings are applied.

6. The apparatus of claim 1, wherein a memory device storing one or more default settings for at least one of the brightness, the vibrancy and a color shift and conditions at which the default settings are applied, the processor configured to adjust one or more of the brightness, the vibrancy, and the color shift for the video content displayed at the video display from the default setting to a condition based upon at least the approximate age of the user over time.

7. A method for displaying video content at a video display to a user, the method comprising:
receiving age data of at least an approximate age of the user from a facility;
receiving, via a digital camera, ambient light level data;
adjusting, via a processor, brightness, vibrancy, and color shift for the video content displayed at the video display based upon the at least approximate age of the user, wherein the vibrancy and color shift are adjusted using pixel shaders on a graphics processing unit; and
adjusting the brightness, the vibrancy, and the color shift for the video content displayed at the video display based upon ambient light data, wherein lower ambient light level results in an increased color shift and vibrancy.

8. The method of claim 7, further comprising:
capturing facial image data of the user; and
processing at the processor the facial image data for deriving the data of at least the approximate age of the user.

9. The method of claim 7, further comprising:
applying a default condition to the display of the brightness, the vibrancy, and the color shift; and
invoking an adjustment to the at least one of the brightness, the vibrancy, and the color shift based upon at least the approximate age of the user over time.

10. A system for adjusting brightness, vibrancy, and color shift for video content displayed at a video display to the user based upon the user's at least approximate age, the system comprising:
a processor that is configured to execute instructions from a memory that cause the processor to:
derive age data of at least an approximate age of the user from a facility;
receive, via a digital camera, ambient light level data;
adjust the brightness, vibrancy, and color shift for the video content displayed at the video display based upon the at least approximate age of the user, wherein the vibrancy and color shift are adjusted using pixel shaders on a graphics processing unit; and
adjust the brightness, the vibrancy, and the color shift for the video content displayed at the video display based upon ambient light data, wherein lower ambient light level results in an increased color shift and vibrancy.

11. The system of claim 10, wherein the facility is a camera disposed to capture a facial image of the user and for determining the at least the approximate age of the user from the facial image.

12. The system of claim 10, wherein the facility includes an interface to a data structure to retrieve user data at the data structure including data representing the at least approximate age of the user.

13. The system of claim 10, wherein the video display is a gaming device video display that is associated with a data structure that includes at least one of a player loyalty data structure and a credit card data structure.

14. The system of claim 10, further comprising a memory device storing one or more default settings for at least one of the brightness, the vibrancy, and a color shift and conditions at which the default settings are applied.

15. An apparatus with a video display for displaying video content to a user, the apparatus comprising:
a processor that is configured to execute instructions from a memory that cause the processor to:
determine an approximate age of the user;
determine an approximate viewer age demographic for the video content;
receive, via a digital camera, ambient light level data;
adjust brightness, vibrancy, and color shift for the video content displayed at the video display based upon the at least approximate age of the user, wherein the vibrancy and color shift are adjusted using pixel shaders on a graphics processing unit; and
adjust the brightness, the vibrancy, and the color shift for the video content displayed at the video display based upon ambient light data, wherein lower ambient light level results in an increased color shift and vibrancy.

16. The apparatus of claim 15, further comprising a memory device storing one or more default settings for at least one of the brightness, the vibrancy and a color shift and conditions at which default settings are applied.

17. A mobile device including software downloadable over a communication network to controllers adapted to display video content, the mobile device comprising:

a processor that is configured to execute instructions from a memory that cause the processor to:

receive age data of at least an approximate age of the user;

receive, via a digital camera, ambient light level data;

adjust brightness, vibrancy, and color shift for the video content displayed at the video display based upon the at least approximate age of the user, wherein the vibrancy and color shift are adjusted using pixel shaders on a graphics processing unit; and dynamically adjust the brightness, the vibrancy, and the color shift for the video content displayed at the video display based upon ambient light data in real time in response to movement by the mobile device between areas with differing ambient light levels, wherein lower ambient light level results in an increased color shift and vibrancy.

18. The mobile device of claim 17, wherein the processor is further configured to (i) access a database storing the data, (ii) access and process a facial image of the user to derive the data, or (iii) receive an input by the user representing the data.

19. The mobile device of claim 17, further comprising instructions to store in a memory at the mobile device, data representing default settings for at least one of the brightness, the vibrancy, and a color shift and conditions at which the default settings are applied.

* * * * *